United States Patent
Chang et al.

(10) Patent No.: US 12,008,568 B1
(45) Date of Patent: *Jun. 11, 2024

(54) SYSTEMS AND METHODS FOR AN AUTHORIZED IDENTIFICATION SYSTEM

(71) Applicant: Wells Fargo Bank, N.A., San Francisco, CA (US)

(72) Inventors: Michael Chang, Millbrae, CA (US); Traci Nguyen, San Francisco, CA (US); Cong Phan, San Francisco, CA (US); Marria Rhodriquez, San Francisco, CA (US); Darrell L Suen, San Ramon, CA (US); Paul Vittimberga, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,044

(22) Filed: Apr. 11, 2022

Related U.S. Application Data

(63) Continuation of application No. 15/897,370, filed on Feb. 15, 2018, now Pat. No. 11,301,847.

(51) Int. Cl.
  *G06Q 20/40* (2012.01)
  *G06Q 20/38* (2012.01)
  *H04L 9/08* (2006.01)

(52) U.S. Cl.
  CPC ....... *G06Q 20/401* (2013.01); *G06Q 20/3829* (2013.01); *H04L 9/0841* (2013.01)

(58) Field of Classification Search
  CPC . G06Q 20/3829; G06Q 20/401; H04L 9/0841
  See application file for complete search history.

(56) References Cited

U.S. PATENT DOCUMENTS

| | | |
|---|---|---|
| 7,266,684 B2 | 9/2007 | Jancula |
| 7,530,099 B2 | 5/2009 | Flurry et al. |
| 7,742,762 B1 * | 6/2010 | Biere .................... H04M 3/247 455/423 |

(Continued)

OTHER PUBLICATIONS

Sung et al., "User Authentication Using Mobile Phones for Mobile Payment", ICOIN 2015. 6 Pages.

*Primary Examiner* — Steven S Kim
(74) *Attorney, Agent, or Firm* — Foley & Lardner LLP

(57) ABSTRACT

An example method includes receiving an encrypted biometric enrollment data and user identifier data. The encrypted biometric enrollment data includes at least one biometric enrollment sample from a user encrypted using an encryption key. The encryption key is generated based on a user secret and the user identifier is associated with the user. The user identifier is matched with a stored user secret. A decryption key is generated based on the stored user secret. The encrypted biometric enrollment data is decrypted using the decryption key. The at least one biometric enrollment sample is retrieved from the decrypted biometric enrollment data. The at least one biometric enrollment sample is processed using a biometric processing algorithm to generate a biometric reference template. A biometric reference template identifier uniquely identifying the biometric reference template is generated. An encryption key is generated based on the stored user secret and encrypts an enrollment confirmation message.

20 Claims, 3 Drawing Sheets

(56) References Cited

U.S. PATENT DOCUMENTS

| | | |
|---|---|---|
| 8,898,759 B2 | 11/2014 | Schultz et al. |
| 9,003,506 B2 * | 4/2015 | Queck .................... H04L 63/08 |
| | | 726/5 |
| 9,088,564 B1 | 7/2015 | Hobson et al. |
| 9,363,262 B1 | 6/2016 | Wilkes |
| 9,552,245 B1 * | 1/2017 | Sharma ............... G06F 11/0709 |
| 9,786,015 B1 * | 10/2017 | Roumeliotis .......... G06Q 40/12 |
| 9,953,318 B1 * | 4/2018 | Firstenberger ......... G06Q 20/40 |
| 10,108,432 B1 * | 10/2018 | Subbiah .............. G06F 9/45512 |
| 10,142,324 B2 | 11/2018 | Dietrich et al. |
| 10,154,029 B1 * | 12/2018 | Griffin ................... H04L 63/06 |
| 10,607,300 B1 * | 3/2020 | Lesner ............... G06Q 30/0615 |
| 10,778,450 B1 | 9/2020 | Griffin et al. |
| 11,301,847 B1 * | 4/2022 | Chang ................. G06Q 20/325 |
| 11,403,637 B2 * | 8/2022 | Lacoss-Arnold ............................ |
| | | G06Q 20/3674 |
| 2002/0150251 A1 | 10/2002 | Asano et al. |
| 2003/0037237 A1 | 2/2003 | Abgrall et al. |
| 2008/0046349 A1 | 2/2008 | Elberg et al. |
| 2008/0268815 A1 * | 10/2008 | Jazra .................. H04L 63/0853 |
| | | 455/411 |
| 2009/0288143 A1 | 11/2009 | Stebila et al. |
| 2010/0024017 A1 | 1/2010 | Ashfield et al. |
| 2010/0191837 A1 * | 7/2010 | Linden ................ H04L 41/0813 |
| | | 709/220 |
| 2011/0088090 A1 | 4/2011 | O'Brien et al. |
| 2011/0159848 A1 | 6/2011 | Pei et al. |
| 2011/0320347 A1 | 12/2011 | Tumminaro et al. |
| 2012/0166809 A1 | 6/2012 | Barton et al. |
| 2013/0191290 A1 | 7/2013 | Glendenning |
| 2013/0262873 A1 | 10/2013 | Read et al. |
| 2014/0122331 A1 | 5/2014 | Vaish et al. |
| 2014/0149294 A1 | 5/2014 | Leevendig et al. |
| 2014/0236792 A1 | 8/2014 | Pant et al. |
| 2015/0012443 A1 * | 1/2015 | Bhat ...................... G06F 9/451 |
| | | 705/50 |
| 2015/0058191 A1 | 2/2015 | Khan et al. |
| 2015/0066719 A1 * | 3/2015 | Agrawal ................ G06Q 40/02 |
| | | 705/35 |
| 2015/0178716 A1 * | 6/2015 | Salonen ................ H04W 12/06 |
| | | 705/44 |
| 2015/0286997 A1 | 10/2015 | Zimmerman et al. |
| 2016/0050192 A1 * | 2/2016 | Banerjee ............. H04L 63/0884 |
| | | 726/6 |
| 2016/0350748 A1 | 12/2016 | Pruthi et al. |
| 2017/0054718 A1 | 2/2017 | Banerjee et al. |
| 2017/0255993 A1 | 9/2017 | Pant et al. |
| 2018/0247312 A1 | 8/2018 | Loganathan et al. |
| 2019/0108511 A1 | 4/2019 | Dunjic et al. |

\* cited by examiner

SYSTEMS AND METHODS FOR AN AUTHORIZED IDENTIFICATION SYSTEM

CROSS-REFERENCE TO RELATED APPLICATIONS AND CLAIM OF PRIORITY

This application is a continuation of U.S. patent application Ser. No. 15/897,370, entitled "Systems and Methods for an Authorized Identification System," filed Feb. 15, 2018, all of which is incorporated herein by reference in its entirety and for all purposes.

TECHNICAL FIELD

Arrangements of the present disclosure relate to systems and methods for facilitating and monitoring payment transactions and account access.

BACKGROUND

Individuals often have one or more accounts that enable them to, among other functions, provide payment to other individuals or entities. For example, an individual may have an account at a financial institution that allows them to pay bills, transfer funds, and the like. These various payments can use any number of payment channels or rails to effectuate the payment. These payment channels or rails (henceforth collectively referred to as "payment channels") may include, but are not limited to, any of the Automated Clearing House ("ACH") payment channel, a wire transfer channel, real-time payment system channel, a credit card processing channel, and the like. For ease of use, many individuals conduct transactions through the account at the financial institution on a mobile computing device.

Today, a typical user might have access to one or more financial institutions with one or more accounts with each financial institution. Because each site is unconnected, an aggregator service may be used to link the user's finances and presents it in a single access point. An aggregator is a web service that accesses a financial service web site to extract users' data and repackages that data for presentation on the aggregator's web site. The enrollment process with an aggregator service typically involves setting up a username and password to access the aggregator's web site and enter details about each bank, brokerage and financial web site they want the aggregator to access on their behalf. Details include the user providing usernames, passwords, account numbers and other secret or confidential information required to access the financial institution web sites. Once the aggregator has the information necessary to access all of a customer's accounts, the aggregator will work behind the scenes to assemble the details about the customer's personal financial life or other confidential information. When a customer visits the aggregator's web site, the aggregator will typically display a list of financial institutions, credit card, brokerage, shopping and other financial accounts, along with associated balances, in a concise, consistent and consolidated fashion. Many aggregators also allow customers to schedule bill payments—where the aggregator moves money from customers' financial institution accounts to vendors or other accounts either electronically or by mailing actual checks—and effectuate transactions through the aggregator service.

To gather information, many aggregators use a technique known as "screen scraping" to access users' information at various financial sites. During screen scraping, the aggregator simulates a human and Internet browser accessing each web site. As will be appreciated, due to the centralization of all financial institution accounts through the aggregator (e.g., a third party), the security at an aggregator's web site is a single point of failure as unauthorized parties could steal customers' private and confidential information and password through compromise of the aggregator account of the user.

SUMMARY

Various embodiments relate to a method. The method includes receiving, by a computing system from an aggregator computing system, an access request of an account at a financial institution, wherein the access request comprises a user identifier and encrypted authentication information, the user identifier associated with a user of the account, and wherein the aggregator computing system has previously received a first account information of the account during a prior access request, decrypting, by the computing system, the encrypted authentication information, matching, by the computing system, the authentication information against a stored authentication information associated with the user identifier, identifying, by computing system, the first account information provided during the prior access request, transmitting, by the computing system to the aggregator computing system, a challenge question to the aggregator computing system, the challenge question comprising a request for the previously provided first account information, receiving, by the computing system from the aggregator computing system, a challenge answer to the challenge question, comparing, by the computing system, the challenge answer to the first account information, authenticating, by the computing system, the aggregator computing system and allowing access to the account if the challenge answer matches the first account information, and providing, by the computing system, an authentication decision to the aggregator computing system, the authentication decision enabling the aggregator computing system to access and display information of the account to the user.

Various other embodiments relate to a system. The system includes a network interface structure to facilitate data transmission over a network, an accounts database including a plurality of user identifiers and associated encrypted authentication information, and a server system. The server system includes a processor and instructions stored in non-transitory machine-readable media, the instructions configured to cause the server system to receive, from an aggregator computing system, an access request of an account at a financial institution, wherein the access request comprises at least one of the plurality of user identifiers and the encrypted authentication information, the at least of the plurality of user identifiers associated with a user of the account, and wherein the aggregator computing system has previously received a first account information of the account during a prior access request, decrypt the encrypted authentication information, match the authentication information against a stored authentication information associated with the at least one of the plurality of user identifier, identify the first account information provided during the prior access request, transmit, to the aggregator computing system, a challenge question to the aggregator computing system, the challenge question comprising a request for the previously provided first account information, receive, from the aggregator computing system, a challenge answer to the challenge question, compare the challenge answer to the first account information, authenticate the aggregator computing system and allowing access to the account if the challenge answer matches the first account information, and provide an authentication decision to the aggregator computing system, the authentication decision enabling the aggregator computing system to access and display information of the account to the user.

Various other embodiments relate to a non-transitory computer readable media having computer-executable instructions embodied therein. The instructions, when executed by a computing system, cause the computing system to perform operations including receiving, from an aggregator computing system, an access request of an account at a financial institution, wherein the access request comprises a user identifier and encrypted authentication information, the user identifier associated with a user of the account, and wherein the aggregator computing system has previously received a first account information of the account during a prior access request, decrypting the encrypted authentication information, matching the authentication information against a stored authentication information associated with the user identifier; identifying the first account information provided during the prior access request, transmitting, to the aggregator computing system, a challenge question to the aggregator computing system, the challenge question comprising a request for the previously provided first account information, receiving, from the aggregator computing system, a challenge answer to the challenge question, comparing the challenge answer to the first account information, authenticating the aggregator computing system and allowing access to the account if the challenge answer matches the first account information, and providing an authentication decision to the aggregator computing system, the authentication decision enabling the aggregator computing system to access and display information of the account to the user.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
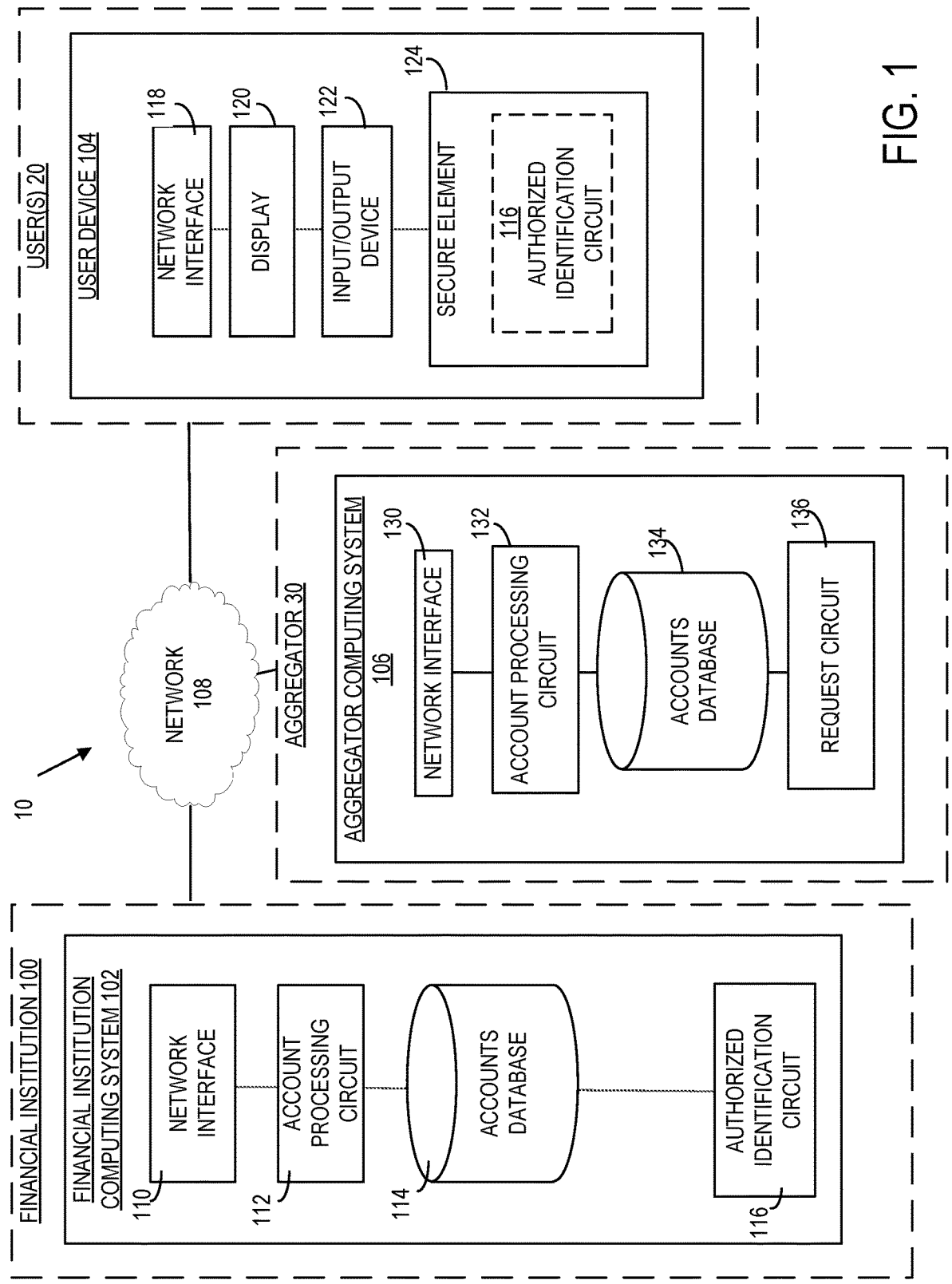
FIG. 1 is a schematic diagram of an authorized identity system, according to an example arrangement.

Transactions over current payment channel ecosystems are increasingly being initiated and conducted on a customer's mobile computing device (e.g., smartphones, tablet computing systems, laptop computing systems, desktop computing systems, PDAs, smart watches, smart glasses, tablets, etc.). Typically, customers install a financial institution's mobile application to one or more mobile computing devices associated with, and primarily used by, the customer. The financial institution mobile application allows the customer to user his or her mobile computing device to access an account with the financial institution. The access typically includes entering a username and passcode combination. Once accessed, the customer can view, conduct transactions, or complete other activity on the customer's mobile computing device. In many instances, the customer may have his or her mobile computing device auto populate login information to access the financial institution account through the mobile application.

Server authentication mechanisms, such as the widely deployed Transport Layer Security ("TLS") protocol, rely on strong asymmetric cryptography supported by a resource intensive Public Key Infrastructure ("PKI"). Public-key cryptosystem methods can easily generate a key pair within a few seconds; however the process to reconstruct a key pair is extremely difficult. The key pair includes a private key and public key. The private key is used to encrypt information and is kept secret whereas the associated public key is shared publicly. Generally, the private key encrypts content or data (e.g., message digest) and the public key can decrypt the data back to its original form. Achieving mutual authentication using TLS is not so common. It is more likely for client authentication to rely on user passwords, since most users lack the personal digital certificates needed to leverage the mutual authentication option of TLS.

When financial institutions create their username/password schemes, they intend that only the consumer associated with each username know the secret password. In many cases, financial institutions do not store actual passwords. Instead, they store only a mathematically hashed value based on the password, which is enough information necessary to detect a valid password. In other words, many financial institutions do not know a password, but they can determine if the customer really knows it. Storing password information in this manner reduces the likelihood of password theft by financial institution employees. This method also helps prevent password theft by Internet hackers. When consumers provide passwords to an aggregator, they reduce the security and safety of their passwords because they are stored at an aggregator's computing facility in a reproducible form. Even if the aggregator stores encrypted passwords, this is less secure than a mathematical hash, because, unlike a financial institution, the aggregator can reproduce the original passwords. Therefore, an aggregator's unscrupulous employee or an unauthorized user (e.g., hacker) could exploit this risk and steal passwords. As such, if customer credentials to an aggregator account are stolen, fraudsters may perform transactions using a customer bank account.

The risks described here, plus financial liability and other regulatory risks, are roadblocks to widespread acceptance of aggregators by consumers, commercial web sites and government regulators. In such an environment, a financial institution is unable to assess whether trustworthy people have access to the customer's financial data through the aggregator service.

An authorized identification system provides a unique identifier—manifested in a wide variety of ways—to allow for a financial institution to discern that an aggregator access account request is on behalf of an authorized user (e.g., customer), is described and provided herein. The authorized identification system represents a user's identity through an aggregator's batch access request and/or specific account access request when a user accesses an account with the financial institution through an aggregator (e.g., Mint, snapchat cash, etc.). The authorized identification system is configured to examine the relationship between a financial institution, aggregator, and a user (e.g., account holder, individual, customer, etc.) and based off of a plurality of inputs and factors, authorize or deny an access request by an aggregator. In a way, the authorized identification system approval of an aggregator access account request is indicative of the likelihood that the aggregator access account request is effectuated by an authorized entity within the aggregator service (e.g., not a hacker or compromised account) and on behalf of the user. Beneficially, the authorized identification system can be a background process that is taking place without the user's knowledge, thus saving time and improving reliability. Additionally, the authorized identification system can prompt the user, through a user device, to authenticate an aggregator access request.

Expanding generally, the authorized identification system is a verification element for an aggregator's access account requests for a user with an account at a financial institution. A user (e.g., customer) first enrolls into the authorized identification system by providing necessary authentication information (e.g., birth certificates, financial statements, state-issued licenses, biometrics, and the like) to have access to the authorized identification system processing system (e.g., a financial institution computing system). When an aggregator service requests access to the account (e.g., access account request) to provide the aggregator services to the customer, the authorized identification system can check the authorized identification element to determine the validity. In this way, the authorized identification system further protects against fraudulent activity, as the presence of the authorized identification element in the aggregator request is indicative that the customer, and not an unauthorized third party, originated the aggregator access request. In other words, verification of the origin of the access request includes a determination that the access request was made on behalf of the user and not an unauthorized or fraudulent third party. The verification includes, for example, whether the access request originated through a user action (e.g., opening up the aggregator service on a mobile application on a user device) or on behalf of a user (e.g., aggregator collects information in accordance with a user's access settings). The presence of an authorized identification element in the aggregator request is indicative of the likelihood that the user, and not an unauthorized third party, originated the aggregator access request and provides verification of the origin of the access request. The authorized identification system may be a part of or controlled by a financial institution or may be a separate (e.g., third party) computing system that manages aggregator requests for a financial institution.

The authorized identification system generates, manages, updates, and provides an authorized identity element to one or more customer devices. In some arrangements, the user enrolls one or more devices (e.g., computing device, mobile device, etc.) in the authorized identification system. An authorized identification element is provided by the financial institution to the user device on the back end as is maintained by the authorized identification system through a secure element on the user device. The authorized identification element may be anonymous in form, such that only the financial institution may discern the true identity of the user associated with the authorized identification element. When the user logs into an aggregator service through the user device, the authorized identification system ensures that the authorized identification element is included with the aggregator's subsequent request to access the user's account. Accordingly, the financial institution can check the authorized identification element to determine the validity of the request when the aggregator service requests access to the user account. If the validity is confirmed, the financial institution has greater assurance that the aggregator request was originally generated on behalf of the user and not an unauthorized or fraudulent third party. In this way, the authorized identification system further protects against fraudulent activity, as the presence of the authorized identification element in the aggregator request is indicative of the likelihood that the user, and not an unauthorized third party, originated the aggregator access request.

While not shown, in some arrangements, a time stamp token ("TST") may be requested from a time stamp authority ("TSA"), for example a TSA computing system. In some arrangements the TST is requested by generating a hash of the record and the biometric sample by the computing system, which is used as an input to a trusted time stamp process. For example, in some arrangements, the hash is transmitted to the TSA, which cryptographically binds the hash to a time stamp to generate the TST. The computing system may retrieve the TST including the hash cryptographically bound to the time stamp. The TST can be subsequently included in the encryption algorithm as the plaintext along with the authorized identification element, used in an account access request, or along with authentication by the authorized identification system. The time stamp token may be subsequently validated by verifying that the time stamp token was generated using the hash. In some arrangements, the TST may be cryptographically bound to the biometric sample.

Referring now to FIG. 1, a computer-implemented authorized identification system 10 is shown, according to an example arrangement. The authorized identification system 10 includes a financial institution computing system 102 associated with a financial institution 100, a user device 104 managed by a user 20, an aggregator computing system 106 associated with an aggregator service 30, and a network 108. In some arrangements, the financial institution 100 subscribes to or is a member of the services provided by an entity that operates the authorized identification system 10. Each computing system 102, 104, 106 may be structured as computer or processing system (e.g., a server with one or more processing circuits) including at least one processor or processing device and at least one memory or memory device. An example structure of the computing systems and other components of FIG. 1 are described herein below following the description of method 200 of FIG. 2 and method 300 of FIG. 3. As will be appreciated, the authorized identification system 10 refers to the general system of generating, managing, monitoring, dynamically updating, and providing authorized identification elements for users 20. The authorized identification circuit 116 refers to the specific circuit carrying out the generating, managing, monitoring, dynamically updating, and providing authorized identification elements for users 20.

The network 108 may include one or more of the Internet, cellular network, Wi-Fi, a proprietary banking network, secure network or intranet, such as an internal banking network associated with the financial institution(s), or any other type of wired or wireless network such as Local Area Network (LAN) or Wide Area Network (WAN). For example, the network 108 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The network 108 is structured to permit the exchange of data, values, instructions, messages, and the like between the financial institution 100, user device 104, and/or aggregator computing system 106.

The user device 104 may be owned by, associated with, or otherwise operated by a user 20. In one arrangement, the user 20 is a user of the financial institution 100 (e.g., may have an account at the financial institution 100). In other arrangements, the user 20 does not have an account associated with the financial institution 100 (i.e., is not a user of the financial institution 100). As shown in the example arrangement of FIG. 1, the user 20 may be an individual user, a representative for a group of users (e.g., a company representative), or the like that has one or more accounts at the financial institution 100. The user device 104 may include any type of mobile device that may be used to monitor or is otherwise associated with the authorized identification circuit 116. For example, the user device 104 may include, but is not limited to, a phone (e.g., smartphone, etc.), a computing device (e.g., tablet computer, laptop computer, person digital assistant, etc.), and a wearable device (e.g., smart eyeglass, a smart watch, and a smart bracelet, or other suitable device).

As shown, the user device 104 includes a network interface 118, a display device 120, an input/output device 122, and a secure element 124. While user device 104 is shown, it will be appreciated that a user 20 may have multiple user devices 104 connected to and able to conduct transactions with an account at the financial institution 100. For example, the user 20 has a smartphone and tablet that he or she uses to access and conduct transactions of the account with the financial institution 100. The network interface 118 may include, for example, program logic and various suitable hardware components (e.g., a network chip) that connect or facilitate connection of the user device 104 to the network 108.

The display device 120 is structured to receive and display a graphical user interface to the user 20. The graphical user interface (GUI) may display various accounts, balances, and payment services available to the user 20. The display 120 may also include showing the user 20 his or her confidence level as determined by the authorized identification circuit 116. In operation, the user 20 can view account details on the display 120 that may include a confidence level, additional authentication options, and/or passcode information The input/output device 122 may be used to permit the user to initiate account access and to facilitate receiving requested information from the user. The input/output device 122 may include, for example, a keypad or keyboard, camera, a touchscreen, a microphone, biometric sensor, or any other device that allows the user to access the authorized identification circuit 116. In some arrangements, biometric information associated with use of the user device (keystrokes, fingerprint, etc.) is captured and sent with the access request of the aggregator computing system 106. For example, the keyboard may capture word usage and typing patterns of the user device 104 and monitor usage of the user device 104. Additionally, the authorized identification circuit 116 may initiate a prompt on the user device and have the user speak passphrase into the input/output device 122 or enter a passcode to allow an access request by the aggregator computing system 106.

The secure element 124 is structured to be a secure memory storage device that may implement the authorized identification circuit 116 in one arrangement. The secure element 124 represents a dynamic environment in which application code and application data can be securely stored and administered and in which secure execution of applications occur. The element may provide delimited memory for each application. The secure element may be implemented either by a separate secure smart card chip (e.g., an embedded secure element), in the SIM/UICC (which is used by GSM mobile phone operators to authenticate subscribers on their networks and maintain personalized subscriber information and applications), or in an SD card that can be inserted in the mobile phone. In some arrangements, the secure element 124 contains some of, or all of, the authorized identification circuit 116. In other arrangements, the secure element 124 may provide for a connection to, link to, or communications to the computing system 102, and in turn the authorized identification circuit 116.

Expanding on authorized identification circuit 116 in the secure element 124, an authorized identification element is provided by the financial institution 100 to the user device on the back end as is maintained by the authorized identification system through a secure element on the user device 104. The authorized identification element may be anonymous in form, such that only the financial institution 100 may discern the true identity of the user associated with the authorized identification element. When the user logs into an aggregator service 30 through the user device 104, the authorized identification system ensures that the authorized identification element is included with the aggregator's 30 subsequent request to access the user's account. Accordingly, the authorized identification circuit 116 in the computing system 102 can check the authorized identification element to determine the validity of the request when the aggregator computing system 106 requests access to the user account. If the validity is confirmed, the financial institution 100 has greater assurance that the aggregator request was originally generated on behalf of the user 20 and not an unauthorized or fraudulent third party. In this way, the authorized identification system 10 further protects against fraudulent activity, as the presence of the authorized identification element in the aggregator request is indicative of the likelihood that the user 20, and not an unauthorized third party, originated the aggregator access request.

Expanding generally on the authorized identification element, the authorized identification element may be in the form of a token, watermark, customer device mapping or smart location mapping. Utilizing information mapping, a user device is enrolled and associated to the user account and a plurality of location and device identity identifiers are collected. The aggregator may be required to provide one or more of the additional user device details during the access request in order to gain authorization to view the user account. In other arrangements, customer device mapping is utilized. The authorized identification system could also be structured to ping the enrolled user device when an aggregator request comes in. If the device is off, and/or the application(s) are not running, then the request is likely to be fraudulent. Customer device mapping includes determining if the aggregator application is currently active on the customer device to determine the likelihood that a user action initiated the aggregator access request. For example, the authorized identification system can communicate with a MNO to determine the location and other details of the user device associated with the aggregator access request. This may include, determining the location of the user device in relation to a cell tower location or the user device account name associated with the phone number to authenticate the aggregator access request with the user of the account.

In some arrangements, the authorized identification element can include a token. The token is provided by the authorized identification system through a mobile application (e.g., financial institution mobile application in the secure element 124) on the user device 104 and granted device permissions to access the aggregator service on a mobile application on the user device 104. Alternatively, the token may be installed in the "background" on a computing device. The authorized identification system facilitates the generation and facilitation of the token from the user device 104, through the aggregator computing system 106, and, ultimately, the computing system 102. Alteration of the token is detectable by the authorized identification system and recreation or replay of the token is infeasible. In some arrangements utilizing the token, an aggregator computing system and the financial institution communicate via an API. The API requires that information requests received from the aggregator include valid identification tokens. The financial institution 100 can place requirements on the tokens to control whether information requests received from the aggregator are fulfilled. For example, the financial institution 100 may first establish a trusted device from which the user may access an aggregator account, and provide a user-identification token to that trusted device. The identification token serves as a private key. Once the user attempts to create an aggregator account, the user device 104 shares the token with the aggregator computing system 106, which decrypts the token with the public key and uses the token to access to the user's financial data. In other arrangements, the identifier is generated each request instance by using a communicative algorithm or key exchange (D-H, asymmetric, symmetric, etc.) and a negotiated secret between the user (e.g., user device) and authorized identification system. The generation and verification of the authorized identification element for single and batch account access requests by the aggregator 30 is described in greater detail below with regard to method 200 of FIG. 2 and method 300 of FIG. 3.

The aggregator computing system 106 is structured to request account information either as a batch request or as individual instance for information about the user 20. The aggregator computing system 106 includes a network interface 130, an account processing circuit 132, an accounts database 134, and a request circuit 136. The network interface 130 is structured to facilitate operative communication between the aggregator computing system 106 and other systems and devices over the network 108.

The account processing circuit 132 is structured to track, maintain, and incorporate account details for user enrolled in the aggregator services, including all linked accounts. The account processing circuit 132 may interact with the authorized identification circuit 116, through the request circuit 136, to respond to a challenge question or provide additional details regarding the user 20 and/or user device 104. Additionally, the account processing circuit 112 may store all or mostly all of the financial institution(s) account information and transaction information in an accounts storage database 114. The enrollment, compilation of data, and presentment to the user on the user-interface of the aggregator 30 is facilitated and maintained by the account processing circuit 132.

In some arrangements, the account processing circuit 132 stores encrypted passwords or hashed passwords of the user for each financial institution in the accounts database 134. The accounts database 134 is structured to store information regarding accounts at the financial institution 100. The information may include, but is not limited to, an age of the user, a membership date, account numbers and type of accounts held by the user, various statements (e.g., credit/debit statements for the accounts), passkey information, and so on, for a plurality of users. Additional information may include details regarding the types of accounts held within a financial institution 100, the type of user (e.g., a representative for many users, a commercial entity, an individual, etc.), prior issues with fraud or other credit related information, when various payment occurred, a receiving entity for each payment, an amount of each payment, a location of the user for each payment, etc.

The request circuit 136 is structured to facilitate account activity (e.g., account balance details, transactions, scheduled payments, etc.) by accessing the user account on the computing system 102. The request circuit 126 may initiate scheduled batch access requests for a plurality of users with accounts at the financial institution 100, a batch access allows the aggregator to populate the user's aggregator user interface with periodic updates. Alternatively, the request circuit 136 may initiate a request to access the single user 20 account with the financial institution 100, for example, to effectuate a transaction or get a real time assessment of the account. As will be appreciated, the authorized identification circuit 116 acts as an authorization engine for all account access requests for the user 20 account, either directly (e.g., through the user device 104) or indirectly (e.g., through verification on the computing system 102). In some arrangements, an authorized identification element token or authentication verification may be pushed to the user device 104 for any aggregator requests originating with the aggregator computing system 106 as a result of a user 20 action (e.g., opening up the aggregator service on a mobile application on the user device 104). The user device 104 could provide the authorized identification element to the aggregator computing system 106, for example, as a token, to authenticate the account access request. In some arrangements, the aggregator computing system 106 authenticates with the computing system 102 directly, irrespective of the user device 104. Those arrangements are performed by having the computing system 102 transmit a challenge question and receive a challenge response from the aggregator computing system 106 indicative of information provided by the computing system 102 to the aggregator computing system 106 during a previous interaction. As will be appreciated, providing the correct previous information is indicative of the aggregator's 30 request being from the aggregator 30 and not an unauthorized user who has compromised the account. This process is described in greater detail below in method 300 of FIG. 3.

As shown, the computing system 102 includes a network interface 110, an account processing circuit 112, an accounts database 114, and the authorized identification circuit 116. In some arrangements, the authorized identification circuit 116 is a standalone computing system in communication with the computing system 102. The network interface circuit 110 is structured to facilitate operative communication between the computing system 102, the user device 104, and the aggregator computing system 106 over the network 108.

The account processing circuit 112 is structured to track, maintain, and incorporate transaction details for an account held by the financial institution 100. The account processing circuit 112 may interact with the authorized identification circuit 116 to ensure that when a user 20, through the aggregator 30, makes a request to send funds to a third-party, that the funds are debited from the proper user account. Additionally, the account processing circuit 112 may store all or mostly all of the transaction information in an accounts storage database 114 within the computing system 102. As shown in FIG. 1, the account processing circuit 112 provides account information to the authorized identification circuit 116 to facilitate the generation of the confidence level for selective approval or denial of a proposed transaction.

The accounts database 114 is structured to store information regarding accounts at the financial institution 100. The information may include, but is not limited to, an age of the user, a membership date, account numbers and type of accounts held by the user, various statements (e.g., credit/debit statements for the accounts), passkey information, and so on, for a plurality of users. Additional information may include details regarding the types of accounts held within a financial institution 100, the type of user (e.g., a representative for many users, a commercial entity, an individual, etc.), prior issues with fraud or other credit related information, when various payment occurred, a receiving entity for each payment, an amount of each payment, a location of the user for each payment, etc. As will be appreciated, these details may provide a user identifier that can be captured by the aggregator computing system 106, provided to the computing system 102 during the access request, and used to authenticate the aggregator's 30 account access request.

The authorized identification circuit 116 is structured to authenticate the account access request from the aggregator computing system 106. As shown in FIG. 1, the authorized identification circuit 116 is implemented with a computing system 102. In another arrangement, and as mentioned above, the authorized identification circuit 116 may be an authorized identification element computing system implemented separate from the computing system 102. When the user 20 logs into the aggregator 30 service through the user device 104, the authorized identification circuit 116 ensures that the authorized identification element is included with the aggregator's subsequent request to access the user's account. Accordingly, the financial institution 100 can check the authorized identification element to determine the validity of the request when the aggregator service requests access to the user account. If the validity is confirmed, the financial institution 100 has greater assurance that the aggregator request was originally generated on behalf of the user 20 and not an unauthorized or fraudulent third party. In this way, the authorized identification circuit 116 is further protects against fraudulent activity, as the presence of the authorized identification element in the aggregator request is indicative of the likelihood that the user, and not an unauthorized third party, originated the aggregator access request.

In some arrangements, the authorized identification circuit 116 is structured to determine a "fraud level" that is indicative of the likelihood that the initiating party of the transaction through the aggregator computing system 106 is the authorized user 20 or on behalf of a user action of the user 20. In this regard, the fraud level of an account access request by the aggregator 30 may be indicative of the level of identifying information provided during the account access request. The fraud level of the account access request may also affect transaction specific details, for example, related to the allowed quantity (i.e., amount) or quality (i.e., recipient) of the requested transaction. For example, if the account access request has a low fraud score and the account access request incudes a large transaction to a new recipient, it may be rejected by the authorized identification circuit 116. The authorized identification circuit 116 may active confirmation by the user 20 on the user device 104 to verify that he or she is the authorized user and account holder. The fraud level may be a sliding scale from 1 to 100 with various numbers benchmarking access to effectuate different levels (e.g., amount, recipient, etc.) of transactions. In other arrangements, the fraud level is a binary system.

In some arrangements, the aggregator computing system 106 may provide a token, watermark, or device identifier along with the account access request to be verified by the authorized identification circuit 116. Through a device identifier, a user device is enrolled and associated to the user account and a plurality of location and device identity identifiers are collected that the aggregator provides during the access request in order to gain authorization to view the user account. In other arrangements, the authorized identification circuit 116 is structured to ping the enrolled user device 104 when an aggregator account access request comes in. If the user device 104 is off, and/or the application(s) are not running, then the request is likely to be fraudulent. In some arrangements, the authorized identification circuit 116 initiates communications with an MNO to determine the location and other details of the user device 104 associated with the aggregator access request. This may include, determining the user device 104 location near a cell tower location or the user device account name associated with the phone number to authenticate the aggregator access request with the user of the account.

In some arrangements, the authorized identification circuit 116 can facilitate the generation and verification of a token. The token is provided by the authorized identification circuit 116 on the user device 104 and granted device permissions to access the aggregator service on a mobile application on the user device 104. Alternatively, the token may be installed in the "background" on the user device 104. The authorized identification circuit 116 facilitates the generation and facilitation of the token from the user device 104, through the aggregator computing system 106, and, ultimately, the computing system 102. Alteration of the token is detectable by the authorized identification system and recreation or replay of the token is infeasible. In some arrangements utilizing the token, an aggregator computing system and the financial institution communicate via an API. The API requires that information requests received from the aggregator include valid identification tokens. The financial institution 100 can place requirements on the tokens to control whether information requests received from the aggregator are fulfilled. For example, the authorized identification circuit 116 may first establish a trusted device from which the user may access an aggregator account, and provide a user-identification token to that trusted device. The identification token serves as a private key. Once the user 20 attempts to create an aggregator account, the user device 104 shares the token with the aggregator computing system 106, which decrypts the token with the public key and uses the token to access to the user's financial data. In other arrangements, the identifier is generated each request instance by using a communicative algorithm or key exchange (D-H, asymmetric, symmetric, etc.) and a negotiated secret between the user (e.g., user device) and authorized identification system. The generation and verification of the authorized identification element for single and batch account access requests by the aggregator 30 is described in greater detail below with regard to method 200 of FIG. 2 and method 300 of FIG. 3.

Figure 2:
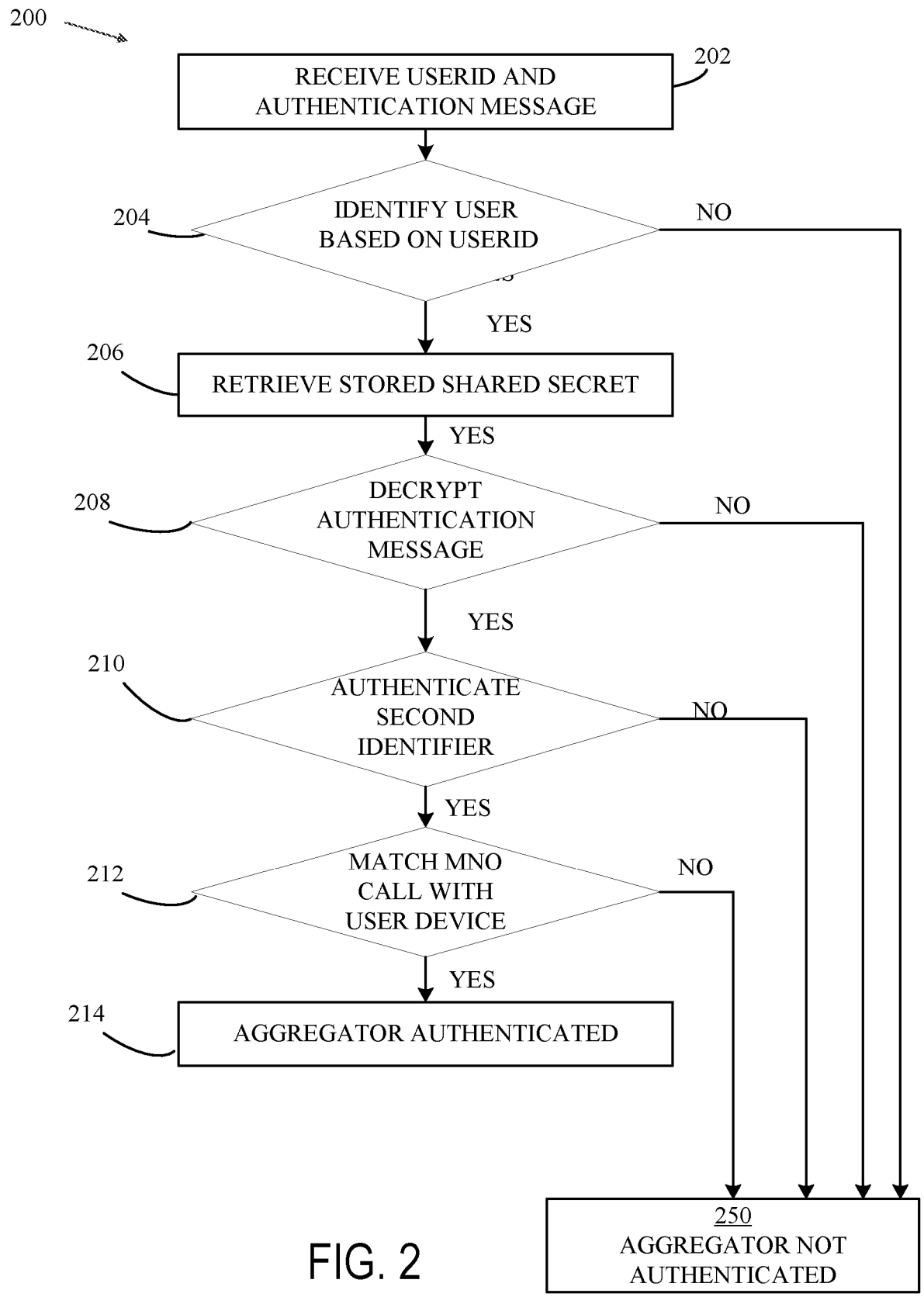
FIG. 2 is a flow diagram of generating and using an authorized identity system in authorizing aggregator access requests, according to an example arrangement.

FIG. 2 is a flow diagram of a method 200 of generating and using an authorized identity system 10 in authorizing aggregator access requests. For example, the aggregator may be an entity who operates the aggregator computing system 106 of FIG. 1. The authorized identification system may be an entity that manages the financial institution 102 of FIG. 1. However, the method 200 may be similarly performed by other systems and devices. Beneficially, the method 200 allows for the authorized identification system 10 to authenticate the aggregator 30 to determine if the user account stored in the aggregator's database is compromised in a wide variety of ways. Accordingly, the method 200 includes verifying multiple authorized identification elements. For example, the method 200 below leverages authenticated key exchange (-AKE) techniques, token processing, and device mapping. As will be appreciated, one or more of the described authorized identification elements may be implemented provide a unique identifier to allow for a financial institution 100 to discern that an aggregator access account request is on behalf of an authorized user.

The method 200 begins when the authorized identification system 10 receives an account access request from an aggregator 30 at 202. The account access request includes a user identifier, an account passphrase, and encrypted authentication information. The encrypted authentication information is encrypted by a Password Authenticated Key Exchange Protocol to establish secure communications and to mutually authenticate. For example, the encryption key can include a symmetric encryption key generated using the Diffie-Hellman ("D-H"), algorithm or other password authenticated key exchange ("PAKE") protocols. In some arrangements, the PAKE protocol is ITU-T Recommendation X.1035 (2007). The PAKE used may comply with the standards outlined in the ISO/IEC 11770-4 standard. Using the protocol, a cryptographic key is derived using the secret knowledge factor. The D-H key agreement allows two parties to establish a cryptographic key without ever actually exchanging the private value. The D-H key establishment provides forward secrecy, a highly desirable protocol property, when participants choose fresh random values each time they operate the protocol, therefore, if a compromise of the long-term keys occurs, it does not compromise the session keys established in previous protocols run involving those principals. The authentication message is encrypted by using the symmetric key. In some arrangements, the aggregator 30 and authorized identification system 10 have agreed to use a user device identifier as the shared secret that will be used by both parties to generate the same keys. In some arrangements, the symmetric key is generated by an authorized identification circuit 116 on the user device 104 and passed to the aggregator 30 when the user 20 initiates the aggregator mobile application.

At 204, the authorized identification system 10 retrieves the stored authentication information (e.g., password) for the user identifier and comparing it to the received authentication information. If they match, the aggregator 30 is verified at 204, as the aggregator 30 has provided the user identifier and authentication information agreed upon by the user 20 and financial institution 100. If they do not match, the aggregator is not authenticated at 250.

At 206, the authorized identification system 10 retrieves the stored shared secret associated with the user identifier. The shared secret is used to generate a symmetric key for decrypting the authentication message. As previously discussed, both parties must have pre-established the shared secret that will be used by both parties to generate the same keys. The key is generated using an agreed upon commutative encryption algorithm, for example, the D-H protocol, based on the user secret.

At 208, the authorized identification system 10 uses the generated cryptographic key to decrypt the message and retrieve the user device identifier (used to generate the cryptographic key) and a second identifier in the form of a token. If the decryption fails, the aggregator 30 is not authenticated at 250. As will be appreciated, the symmetric (e.g., cryptographic) key, generated from the shared secret, protects the confidentiality of user credentials and other message data transferred during operation of the authorized identification system 10 and provides a unique subset of data (e.g., the user device) that can easily attained by the aggregator 30 but is more difficult to attain by an unauthorized party.

At 210, the second identifier is authenticated. The second identifier may include a token that is provided by the authorized identification circuit on the user device 104 to the aggregator 30 when the user 20 accesses the aggregator mobile application on the user device 104. Generally, the token may include establishing an API information sharing relationship with aggregator where aggregator agrees to utilize the API to access information. The API information requests must include decrypted identification tokens received from trusted customer devices. The aggregator is provided a token via the API that is signed by the authorized identification system 10 or user device 104 private key. The token is subsequently retrieved by the authorized identification system 10 from the encrypted message and provided to a tokenization service or decrypted using a public key of the authorized identification system 10 or user device 104. If the token authentication fails, the aggregator is not authenticated at 250.

In other arrangements, the second identifier may be, for example, a possession object such as the magnetic strip data from a debit or ATM card, or the information commonly used for on line purchases from a user payment card. Possession objects (i.e., the "something-you-have factor") of any kind or format are supported by this system, including RFID identifiers from tagged physical objects registered with the relying party as known user possessions. Alternatively, the possession object identifiers could be a key fob, a MAC address for a computing device, a coordinate location pairing, etc. In order to be authenticated, the aggregator would have to retrieve the object identifier from the user device when initiating an account access request. In some arrangements, the user has a fob that is the possession object identifier associated with the user identifier. Alternatively, the second identifier may be in the form of a biometric sample, optionally including an identifier of the biometric technology type to be matched. The biometric sample may also be a more elaborate structure containing a URI that points to a BSP address and that contains in its query string the unique biometric reference template identifier to which the user claims their provided sample will match.

At 212, the authorized identification system 10 uses the user device identifier that generated the cryptographic key to authenticate the information through an MNO call. The MNO call may include identifying the customer device profile associated with the user identifier, determining the mobile carrier that is providing the information, receiving data from the carrier about the device in real time (e.g., location), and compare the user device identifier data in the message to the user device identifier data from the carrier. Alternatively, the authorized identification system 10 may ping the enrolled user device 104 when an aggregator account access request comes in. If the user device 104 is off, and/or the application(s) are not running, then the request is likely to be fraudulent and authentication of the aggregator 30 fails at 250.

At 214, the aggregator 30 is authenticated and allowed access to the user account. The aggregator 30 receives account information through screen scraping or from a select amount of data transmitted by the authorized identification system 10.

Figure 3:
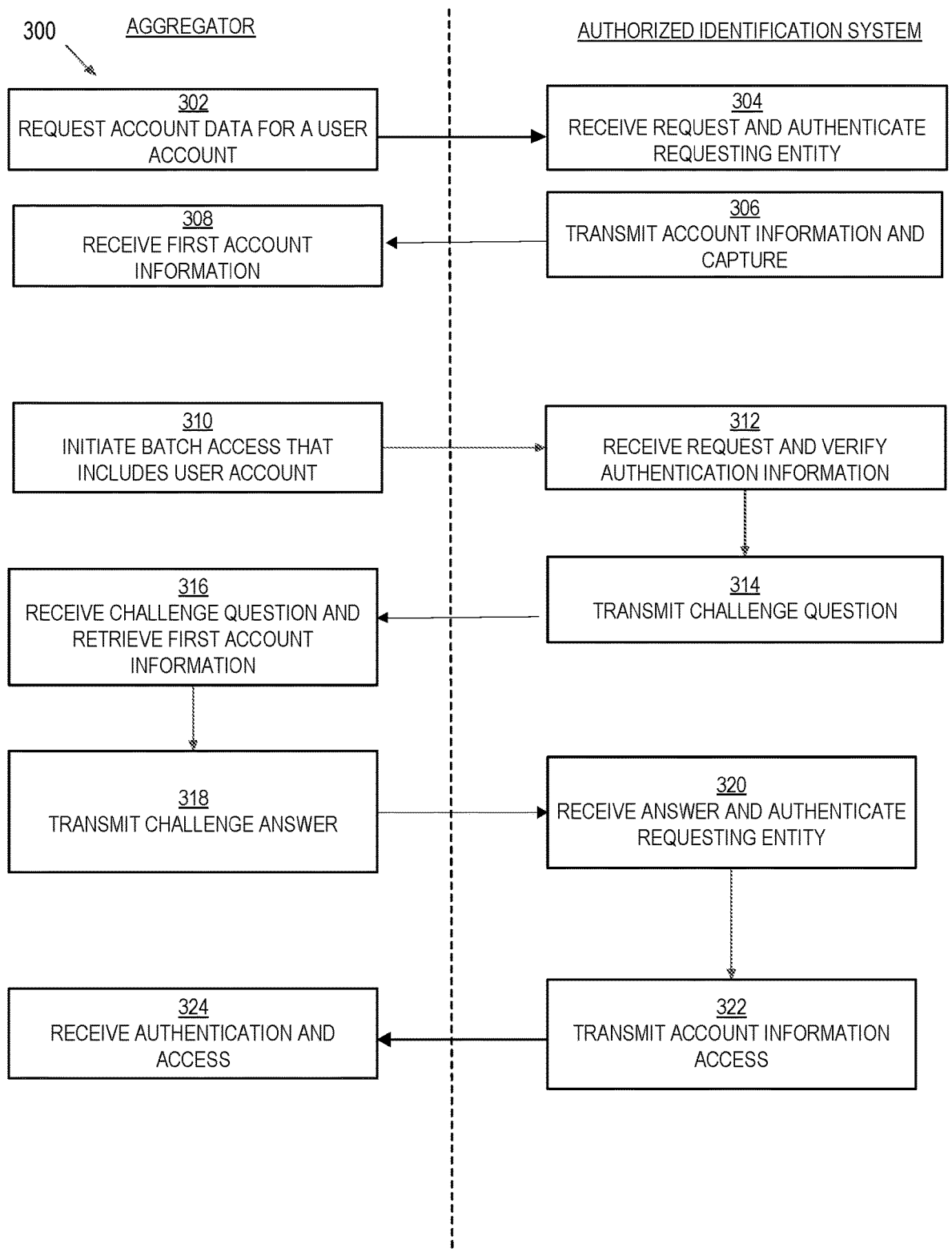
FIG. 3 is a flow diagram of generating and using an authorized identity system in authorizing aggregator batch access requests, according to an example arrangement.

FIG. 3 is a flow diagram of a method 300 of generating and using an authorized identity system 10 in authorizing aggregator batch access requests. For example, the aggregator may be an entity who operates the aggregator computing system 106 of FIG. 1. The authorized identification system may be an entity that manages the computing system 102 of FIG. 1. However, the method 300 may be similarly performed by other systems and devices. As will be appreciated, batch access requests present the unique problem of not being user 20 initiated. Instead, a batch access is when the aggregator 30 requests access to gather information for a plurality of accounts on a time interval (e.g., twice a day, every 20 minutes). Accordingly, the user 20 and/or user device 104 does not initiate the transaction and thus may be unable to pass a token or other identifier when the aggregator 30 initiates the account access request. Beneficially, the method 300 allows for the authorized identification system 10 to authenticate the aggregator 30 to determine if the user account stored in the aggregator's database is compromised.

The method 300 begins with the aggregator 30 requesting account data for a user 20 that has an account at a financial institution 100 at 302. The request may be over a TLS or utilize a PKI or other encryption algorithm to ensure secure, encrypted data transfer between the aggregator 30 and authorized identification system 10. The request includes a user identifier and authentication information. The user identifier is associated with a user of the account that is to be accessed. The authentication information includes a password or other mechanism that the financial institution 100 and user 20 agreed to for access control with the financial account. As will be appreciated, the aggregator 30 uses the user 20 password and username to access the user account.

At 304, the authorized identification system 10 receives the request from the aggregator 30 that includes the user identifier and authentication information and authenticates the aggregator 30. The authentication includes retrieving the stored authentication information (e.g., password) for the user identifier and comparing it to the received authentication information. If they match, the aggregator 30 is authorized for access, as the aggregator 30 has provided the user identifier and authentication information agreed upon by the user 20 and financial institution 100.

At 306, the authorized identification system 10 transmits the account information to the aggregator 30. In some arrangements, the authorized identification system 10 may provide a specific type or amount of data to the aggregator 30. In other arrangements, the aggregator 30 is given the same access to the user account as the user 20 is, allowing the aggregator to screen scrape the account information and/or effectuate transactions through the user account. In some arrangements, the authorized identification system 10 captures one or more details from the account at the point in time that the aggregator 30 has access to it. For example, the authorized identification system 10 may capture that the balance of the checking account is 3,456 U.S.D. when the aggregator 30 accesses the account.

At 308, the aggregator 30 receives first account information, either through screen scraping or from a select amount of data transmitted by the authorized identification system 10.

Subsequently, at 310, the aggregator 30 initiates a second account access request, for the same account as accessed at 302, in a batch access request. The request may be over a TLS or utilize a PKI or other encryption algorithm to ensure secure, encrypted data transfer between the aggregator 30 and authorized identification system 10. The request includes the user identifier and authentication information. The authentication information includes a password or other mechanism that the financial institution 100 and user 20 agreed to for access control with the financial account.

At 312, the authorized identification system 10 receives the request from the aggregator 30 that includes the user identifier and authentication information and authenticates the aggregator 30. The authentication includes retrieving the stored authentication information (e.g., password) for the user identifier and comparing it to the received authentication information. If they match, the aggregator 30 is verified as possessing the user's 20 account credentials, as the aggregator 30 has provided the user identifier and authentication information agreed upon by the user 20 and financial institution 100.

At 314, the authorized identification system 10 transmits a challenge question to the aggregator 30 to authenticate. The authorized identification system 10 identifies that the access request is originating from the same aggregator 30 as the previous access request. The authorized identification system 10 may use similar access ports, communications channels, batch access characteristics, and other attributes of the account access request and account access mechanism to identify that the request is from the same aggregator 30. After identifying the aggregator 30, the authorized identification system 10 retrieves one or more account data elements of the user account from when the aggregator 30 previously accessed the user account and uses the account data elements to populate the challenge question. For example, the challenge question may be the balance of the checking account of the user during the previous access event by the aggregator 30.

At 316, the aggregator 30 receives the challenge question and retrieves the first account information associated with the challenge question. For example, the aggregator 30 provides the balance of "3,456 U.S.D." in response to the challenge question. At 318, the aggregator transmits the challenge answer to the authorized identification system 10.

At 320, the authorized identification system 10 receives the challenge answer from the aggregator 30 and authenticates the requesting entity. As will be appreciated, an unauthorized entity that gained access to the user identifier and authentication information would not have access to the information to answer the account information associated with the challenge question. Typically, an account compromised through the aggregator results in the username and password being compromised. Beneficially, the authorized identification system 10 leverages a second identifier through information already being captured by the aggregator 30, and unknown to a subsequent unauthorized party.

At 322, the authorized identification system 10 transmits the account information to the aggregator 30. In some arrangements, the authorized identification system 10 may provide a specific type or amount of data to the aggregator 30. In other arrangements, the aggregator 30 is given the same access to the user account as the user 20 is, allowing the aggregator to screen scrape the account information and/or effectuate transactions through the user account. In some arrangements, the authorized identification system 10 captures one or more details from the account at the point in time that the aggregator 30 has access to it. For example, the authorized identification system 10 may capture that the balance of the checking account is 3,456 U.S.D. when the aggregator 30 accesses the account.

At 324, the aggregator 30 receives second account information, either through screen scraping or from a select amount of data transmitted by the authorized identification system 10.

The embodiments described herein have been described with reference to drawings. The drawings illustrate certain details of specific embodiments that implement the systems and methods described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be remote processors (e.g., a cloud based processor). Alternatively or additionally, the one or more processors may be internal and/or local to the apparatus. In this regard, a given circuit, or components thereof, may be disposed locally (e.g., as part of a local server, a local computing system, etc.) or remotely (e.g., as part of a remote server such as a cloud based server). To that end, a "circuit," as described herein, may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data that cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick, camera, microphone, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, ERC 20, and the like. Any foregoing references to blockchains or repositories are intended to include any distributed ledgers. Examples of distributed ledgers include R3CEV Corda, blockchain, Hyperledger, Ethereum, and the like.

It should be noted that, although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed:

1. A method, comprising:
    receiving, by a computing system from an aggregator computing system, an access request of an account at a financial institution, wherein the access request comprises a user identifier and encrypted authentication information, the user identifier associated with a user of the account, and wherein the aggregator computing system has previously received a first account information of the account during a prior access request, wherein the encrypted authentication information comprises user device data and a token identifier;
    decrypting, by the computing system, the encrypted authentication information;
    deriving, by the computing system, a device identifier of the user device data from the decrypted authentication information;
    verifying, by the computing system, that the derived device identifier and the token identifier contained in the decrypted authentication information correspond to a stored authentication information associated with the user identifier;
    querying, by the computing system, a mobile network operator for updated data about the derived device identifier;
    receiving, by the computing system, from the mobile network operator, the updated data;
    verifying, by the computing system, the updated data against the user device data;
    identifying, by the computing system, the first account information provided during the prior access request;
    transmitting, by the computing system to the aggregator computing system, a challenge question to the aggregator computing system, the challenge question comprising a request for the previously provided first account information;
    receiving, by the computing system from the aggregator computing system, a challenge answer to the challenge question;
    comparing, by the computing system, the challenge answer to the first account information;
    authenticating, by the computing system, the aggregator computing system based on the challenge answer matching the first account information and based on the verification of the decrypted authentication information; and
    providing, by the computing system, an authentication decision to the aggregator computing system, the authentication decision enabling the aggregator computing system to access and display information of the account to the user.

2. The method of claim 1, wherein the challenge question is a first challenge question, and wherein authenticating the aggregator computing system further comprises:
    transmitting, by the computing system to a user device, a device query comprising a second challenge question of at least one of the user device being active and an active connection between the user device and the aggregator computing system; and
    receiving, by the computing system from the user device, a device query answer responsive to the second challenge question, wherein the aggregator computing system is given access to a user account of the user if at least one of the user device being active and active connection between the user device and the aggregator computing system is correct.

3. The method of claim 1, further comprising verifying, by the computing system, an origin of the access request, wherein verifying the origin includes at least one of completion of an authenticated key exchange and identification of a status of a user device associated with the user.

4. The method of claim 3, wherein verifying the origin of the access request further comprises:
    transmitting, to the aggregator computing system, a challenge action, the challenge action requiring the aggregator computing system to access the account through the user device;
    receiving, by the computing system from the user device, a challenge action response, the challenge action response responsive to the challenge action and originated by the aggregator computing system; and
    transmitting, by the computing system and to the aggregator computing system, financial data of the account.

5. The method of claim 3, wherein data of the user device is used as an input to a password of the authenticated key exchange.

6. The method of claim 1, wherein the encrypted authentication information in encrypted by a password authenticated key exchange protocol.

7. The method of claim 6, wherein the password authenticated key exchange protocol uses an encryption key generated using a Diffie-Hellman encryption algorithm.

8. A system comprising:
    a network interface structure to facilitate data transmission over a network;
    an accounts database including a plurality of user identifiers and associated encrypted authentication information; and
    a server system comprising a processor and instructions stored in non-transitory machine-readable media, the instructions configured to cause the server system to:
        receive, from an aggregator computing system, an access request of an account at a financial institution, wherein the access request comprises at least one of the plurality of user identifiers and the encrypted authentication information, the at least of the plurality of user identifiers associated with a user of the account, and wherein the aggregator computing system has previously received a first account information of the account during a prior access request, wherein the encrypted authentication information comprises user device data and a token identifier;
decrypt the encrypted authentication information;
derive a device identifier of the user device data from the decrypted authentication information;
verify that the derived device identifier and the token identifier contained in the decrypted authentication information correspond to a stored authentication information associated with the at least one of the plurality of user identifiers;
query a mobile network operator for updated data about the derived device identifier;
receive, from the mobile network operator, the updated data;
verify the updated data against the user device data;
identify the first account information provided during the prior access request;
transmit, to the aggregator computing system, a challenge question to the aggregator computing system, the challenge question comprising a request for the previously provided first account information;
receive, from the aggregator computing system, a challenge answer to the challenge question;
compare the challenge answer to the first account information;
authenticate the aggregator computing system based on the challenge answer matching the first account information and based on the verification of the decrypted authentication information; and
provide an authentication decision to the aggregator computing system, the authentication decision enabling the aggregator computing system to access and display information of the account to the user.

9. The system of claim 8, wherein the challenge question is a first challenge question, and wherein the instructions further cause the server system to:
transmit, to a user device, a device query comprising a second challenge question of at least one of the user device being active and an active connection between the user device and the aggregator computing system; and
receive, from the user device, a device query answer responsive to the second challenge question, wherein the aggregator computing system is given access to a user account of the user if at least one of the user device being active and active connection between the user device and the aggregator computing system is correct.

10. The system of claim 8, wherein the instructions further cause the server system to verify an origin of the access request, wherein verifying the origin includes at least one of completion of an authenticated key exchange and identification of a status of a user device associated with the user.

11. The system of claim 10, wherein the instructions further cause the server system to:
transmit, to the aggregator computing system, a challenge action, the challenge action requiring the aggregator computing system to access the account through the user device;
receive, from the user device, a challenge action response, the challenge action response responsive to the challenge action and originated by the aggregator computing system; and
transmit, to the aggregator computing system, financial data of the account.

12. The system of claim 10, wherein data of the user device is used as an input to a password of the authenticated key exchange.

13. The system of claim 8, wherein the encrypted authentication information in encrypted by a password authenticated key exchange protocol.

14. The system of claim 13, wherein the password authenticated key exchange protocol uses an encryption key generated using a Diffie-Hellman encryption algorithm.

15. A non-transitory computer readable media having computer-executable instructions embodied therein that, when executed by a computing system, cause the computing system to perform operations comprising:
receiving, from an aggregator computing system, an access request of an account at a financial institution, wherein the access request comprises a user identifier and encrypted authentication information, the user identifier associated with a user of the account, and wherein the aggregator computing system has previously received a first account information of the account during a prior access request, wherein the encrypted authentication information comprises user device data and a token identifier;
decrypting the encrypted authentication information;
deriving a device identifier of the user device data from the decrypted authentication information;
verifying that the derived device identifier and the token identifier contained in the decrypted authentication information correspond to a stored authentication information associated with the user identifier;
querying a mobile network operator for updated data about the derived device identifier;
receiving from the mobile network operator, the updated data;
verifying the updated data against the user device data;
identifying the first account information provided during the prior access request;
transmitting, to the aggregator computing system, a challenge question to the aggregator computing system, the challenge question comprising a request for the previously provided first account information;
receiving, from the aggregator computing system, a challenge answer to the challenge question;
comparing the challenge answer to the first account information;
authenticating the aggregator computing system based on the challenge answer matching the first account information and based on the verification of the decrypted authentication information; and
providing an authentication decision to the aggregator computing system, the authentication decision enabling the aggregator computing system to access and display information of the account to the user.

16. The computer readable media of claim 15, wherein the challenge question is a first challenge question, and wherein the instructions further cause the computing system to:
transmit, to a user device, a device query comprising a second challenge question of at least one of the user device being active and an active connection between the user device and the aggregator computing system; and receive, from the user device, a device query answer responsive to the second challenge question, wherein the aggregator computing system is given access to a user account of the user if at least one of the user device being active and active connection between the user device and the aggregator computing system is correct.

17. The computer readable media of claim 15, wherein the instructions further cause the computing system to verify an origin of the access request, wherein verifying the origin includes at least one of completion of an authenticated key exchange and identification of a status of a user device associated with the user.

18. The computer readable media of claim 17, wherein the instructions further cause the computing system to:
- transmit, to the aggregator computing system, a challenge action, the challenge action requiring the aggregator computing system to access the account through the user device;
- receive, from the user device, a challenge action response, the challenge action response responsive to the challenge action and originated by the aggregator computing system; and
- transmit, to the aggregator computing system, financial data of the account.

19. The computer readable media of claim 17, wherein data of the user device is used as an input to a password of the authenticated key exchange.

20. The computer readable media of claim 15, wherein the encrypted authentication information in encrypted by a password authenticated key exchange protocol.

* * * * *